United States Patent [19]

Winfield et al.

[11] 4,333,981

[45] Jun. 8, 1982

[54] ABRASION RESISTANT IMPACT ABSORBENT ANIMAL STALL FLOOR AND WALL COVERING

[76] Inventors: Armand G. Winfield; Barbara L. Winfield, both of P.O. Box 1296, Santa Fe, N. Mex. 87501

[21] Appl. No.: 146,775

[22] Filed: May 5, 1980

[51] Int. Cl.³ .................................................. B32B 7/02
[52] U.S. Cl. ..................................... 428/215; 428/515; 428/516; 428/319.3; 119/28; 428/319.7
[58] Field of Search ............... 428/215, 315, 515, 516, 428/332; 119/27, 28; 264/169

[56] References Cited

U.S. PATENT DOCUMENTS

| | | | |
|---|---|---|---|
| 3,066,646 | 12/1962 | Bramley | 264/169 |
| 3,979,540 | 9/1976 | Moffett | 428/315 |
| 4,129,097 | 12/1978 | Schwartzkopff et al. | 119/28 |

*Primary Examiner*—Marion McCamish
*Assistant Examiner*—Beverly K. Johnson
*Attorney, Agent, or Firm*—Scully, Scott, Murphy & Presser

[57] ABSTRACT

An abrasion resistant, impact absorbent animal stall floor and wall covering comprises a liquid impermeable ionomer resin layer having an aggregate thickness of at least about 5 mils superimposed upon a foamed resin layer having an aggregate thickness of at least 200 mils and an aggregate density in the range of from about 0.50 to about 10.0.

24 Claims, No Drawings

ABRASION RESISTANT IMPACT ABSORBENT ANIMAL STALL FLOOR AND WALL COVERING

BACKGROUND OF THE INVENTION

1. Field of the Invention

The present invention relates to floor and wall coverings for stalls occupied by livestock such as cattle and horses, and domestic animals such as dogs and cats.

2. Description of the Prior Art

U.S. Pat. No. 3,066,646 describes bedding for livestock and domestic animals in which a relatively thick resilient polyurethane foam is fully enveloped by a relatively thin polyvinylchloride layer reinforced with a polyethylene terephthalate web. Experience with foamed floor coverings topped with a polyvinylchloride layer has shown this polymer to be incapable of providing service for extended periods, especially where large, physically vigorous animals such as horses are concerned. After only a few months of use, the polyvinylchloride tends to become abraded to the point where portions of the underlying foam layer are exposed. The attendant loss of hygienic protection in floor coverings of this type presents yet another significant drawback to their practical use in animal care facilities. U.S. Pat. No. 3,461,844 describes an animal stall mat in which a hard polymer layer, preferably a polyurethane, containing a lightweight filler such as glass microbubbles, is adhered to a rubbery polyurethane layer polymerized in situ. While thermosetting polyurethanes generally possess excellent abrasion resistance properties, they are expensive as resin materials go and their fabrication into smooth-surfaced laminates is accomplished only with a relatively high level of complexity and labor. U.S. Pat. No. 3,979,540 describes a coated flexible substrate, said to be useful as a decorative roof for an automobile, which includes a top layer of an ionomer resin of 10–40 mils in thickness adhered to a foamed polyolefin resin of 1–100 mils thick. The foregoing flexible substrate is far too thin even at its maximum thickness to offer even marginal utility as an animal floor and wall covering medium.

Accordingly, there has heretofore existed a need for an inexpensive, readily fabricated animal stall floor and wall covering which is able to sustain the abrasive effects of animals' hooves even after several years of regular use.

SUMMARY OF THE INVENTION

In accordance with the present invention, an abrasion resistant, impact absorbant animal floor and wall covering is provided which comprises a laminate of:

(a) a liquid-impermeable layer of an ionomer resin, said layer having an aggregate minimum thickness of about 5 mils, superimposed upon (b) a foamed resin layer having an aggregate minimum thickness of about 200 mils and an aggregate density in the range of from about 0.50 to about 10.0.

The animal floor and wall coverings herein, after several months of continuous use in horse stables under actual in-service conditions, have developed no appreciable abrasion in the ionic copolymer layer. It has been conservatively estimated that the useful life of the animal stall floor and wall coverings of this invention will be on the order of five years or more. Sanitary conditions are very easily maintained with the present laminate structure, it being necessary only to wash the upper, ionomer resin surface layer thereof with water or other cleansing liquid as occasion requires.

DESCRIPTION OF THE PREFERRED EMBODIMENTS

The ionomer resins employed in the manufacture of the laminate structure herein constitute a well known class of thermoplastics and include the ionic copolymers disclosed in U.S. Pat. Nos. 3,264,272 and 3,322,734, the disclosures of which are incorporated herein by reference.

The preferred ionomer resins for use herein can be obtained by copolymerizing a monoethylenically unsaturated alpha-olefin of from 2 to 10 carbon atoms and an alpha, beta-ethylenically unsaturated carboxylic acid of from 3 to 8 carbon atoms to provide a copolymer containing at least 50 mol percent polymerized alpha-olefin and from 0.2 to 25 mol percent polymerized alpha, beta-ethylenically unsaturated carboxylic acid in random distribution and thereafter reacting the copolymers with an ionizable metal compound which results in a form of crosslinking.

Monoethylenically unsaturated alpha-olefins which can be employed in the formation of the ionomer resins include ethylene, propylene, butene-1, pentene-1, hexene-1, heptene-1, 3-methylbutene-1, 4-methylpentene-1, and so on. Among the alpha, beta-ethylenically unsaturated carboxylic acids which can be reacted with the alpha-olefins to form the non-crosslinked copolymers include acrylic acid, methacrylic acid, ethacrylic acid, itaconic acid, maleic acid, fumaric acid, monesters of dicarboxylic acids such as methyl hydrogen maleate, methyl hydrogen fumarate and ethyl hydrogen fumarate and the chemically equivalent acid anhydrides such as maleic anhydride.

Metal ions which are advantageously employed in the formation of the ionically crosslinked copolymers can be selected from among the uncomplexed and complexed ions, as described in the aforesaid U.S. Pat. No. 3,264,272. Examples of useful uncomplexed metal ions are the mono, -di- and trivalent ions of the metals of Groups I, II, III, IV-A and VIII of the Periodic Table of the Elements. Suitable monovalent metal ions are those of sodium, potassium, lithium, cesium, silver, mercury and copper. Suitable divalent metal ions are those of beryllium, magnesium, calcium, strontium, barium, copper, cadmium, mercury, tin, lead, iron, cobalt, nickel and zinc. Suitable trivalent metal ions are those of aluminum, selenium, iron and yttrium. Alkali metal ions are preferred. The crosslinking reaction is preferably carried out by blending the copolymer bases with a sufficient amount of a solution of crosslinking metal compound calculated to result in neutralization of at least 10 percent of the carboxylic acid groups present in the copolymer chain and separating the resulting crosslinked copolymer.

In general, the properties of the ionomer resins which are useful in the fabrication of the laminate structures herein fall within the ranges as set forth in TABLE I:

TABLE I

| PROPERTY | ASTM METHOD | RANGE OF VALUES |
|---|---|---|
| Melt Flow Index, Decigm/min. | D-1238 | 1.0–15.0 |
| Specific Gravity (density) | D-792 | 0.920–0.980 |
| Area Yield, in$^2$/lb at 10 mils | — | 2,800–3,000 |
| TOUGHNESS Tensile Impact, ft lb in$^2$ at 72° F. | D-1822 | 275–550 |

TABLE I-continued

| PROPERTY | ASTM METHOD | RANGE OF VALUES |
|---|---|---|
| Brittleness Temp, °F. | D-746 | −200-20 |
| MECHANICAL | | |
| Tensile Strength, M psi | D-1708 | 2.70-4.70 |
| MIT Flex, cycles, 25 mils thick | — | 400-4000 |
| Yield Strength, M psi | D-1708 | 1.00-4.00 |
| Elongation, % | D-1708 | 300-550 |
| Flex Modulus, M psi | D-790-A | 20-60 |
| Hardness (Shore D) | D-2240 | 55-70 |
| Abrasion Resistance, National Bureau of Standard Index | D-1630 | 100-700 |
| THERMAL | | |
| Heat Deflection Temp., at 66 psi °F. | D-648 | 105-130 |
| Heat Deflection Temp., with 30% Glass Filler, at 66 psi | D-648 | 125-200 |
| Vicat Temperature, °F.-Rate B | D-1525-70 | 125-185 |
| Melting Point, °F., by Differential Thermal Analysis | — | 160-220 |
| Freezing Point, °F., by Differential Thermal Analysis | — | 120-200 |

A particularly useful group of ionomer resins which can be used herein are the "Surlyn" resins (E. I. du Pont de Nemours and Company). Some typical properties for a number of "Surlyn" resins are given in TABLE II hereinbelow.

TABLE II

| PROPERTY | ASTM METHOD | "SURLYN" 1555 | "SURLYN" 1557 | "SURLYN" 1559 | "SURLYN" AD 8104 1554 | "SURLYN" AD 1804 5% CARBON | "SURLYN" 1560 | "SURLYN" 1650 |
|---|---|---|---|---|---|---|---|---|
| Melt Flow Index, Decigm/min. | D-1238 | 10.0 | 5.0 | 1.2 | 1.0 | 1.0 | 5.0 | 1.5 |
| Specific Gravity (density) | D-792 | 0.945 | 0.945 | 0.941 | 0.942 | 0.970 | 0.960 | 0.950 |
| Area Yield, in²/lb at 10 mils | — | 2,880 | 2,880 | 2,892 | 2,889 | 2,805 | 2,835 | 2,865 |
| TOUGHNESS | | | | | | | | |
| Tensile Impact, ft lb in² at 72° F. | D-1822 | 243 | 331 | 446 | 471 | 352 | 296 | 407 |
| Brittleness Temp, °F. | D-746 | −105 | −112 | −140 | −128 | — | −105 | −148 |
| MECHANICAL | | | | | | | | |
| Tensile Strength, M psi | D-1708 | 3.03 | 2.90 | 3.89 | 3.85 | 3.26 | 3.95 | 3.94 |
| MIT Flex, cycles, 25 mils thick | — | — | — | 2,170 | 1,160 | — | 580 | 1,680 |
| Yield Strength, M psi | D-1708 | 1.63 | 1.72 | 1.66 | 1.77 | 2.90 | 2.08 | 3.4 |
| Elongation, % | D-1708 | 388 | 322 | 412 | 372 | 257 | 365 | 491 |
| Flex Modulus, M psi | D-790-A | 35.63 | 36.57 | 37.09 | 36.51 | 46.47 | 47.03 | 25.24 |
| Hardness (Shore D) | D-2240 | 62 | 63 | 62 | 62 | 68 | 68 | 60 |
| Abrasion Resistance, National Bureau of Standard Index | D-1630 | 120 | — | 600 | — | — | 135 | 120 |
| THERMAL | | | | | | | | |
| Heat Deflection Temp., at 66 psi °F. | D-648 | 114 | 116 | 125 | 121 | 116 | 115 | 110 |
| Heat Deflection Temp., with 30% Glass Filler, at 66 psi | D-648 | — | 140 | 145 | — | — | 131 | — |
| Vicat Temperature, °F.-Rate B | D-1525-70 | 161 | 158 | 165 | 170 | 174 | 131 | 165 |
| Melting Point, °F., by Differential Thermal Analysis | — | 204 | 201 | 204 | 205 | 205 | 189 | 196 |
| Freezing Point, °F., by Differential Thermal Analysis | — | 169 | 167 | 162 | 162 | 181 | 136 | 185 |

| PROPERTY | ASTM METHOD | "SURLYN" 1652 | "SURLYN" AD 8155 | "SURLYN" 1706 | "SURLYN" 1707 | "SURLYN" 1801 | "SURLYN" 1605 | "SURLYN" AD 8102 | "SURLYN" AD 8152 |
|---|---|---|---|---|---|---|---|---|---|
| Melt Flow Index, Decigm/min. | D-1238 | 5.0 | 1.0 | 0.7 | 0.9 | 1.0 | 2.8 | 14.0 | 5-10.0 |
| Specific Gravity (density) | D-792 | 0.936 | 0.960 | 0.966 | 0.950 | 0.960 | 0.950 | 0.950 | 0.946 |
| Area Yield, in²/lb at 10 mils | — | 2,967 | 2,835 | 2,817 | 2,865 | 2,835 | 2,865 | 2,865 | 2,876 |
| TOUGHNESS | | | | | | | | | |
| Tensile Impact, ft lb in² at 72° F. | D-1822 | 356 | 469 | 456 | 427 | 492 | 447 | 329 | 283 |
| Brittleness Temp, °F. | D-746 | −58 | −170 | −158 | — | −166 | −160 | — | — |
| MECHANICAL | | | | | | | | | |
| Tensile Strength, M psi | D-1708 | 3.03 | 3.68 | 3.90 | 5.09 | 4.41 | 4.26 | 3.61 | 3.74 |
| MIT Flex, cycles, 25 mils thick | — | 2,600 | — | 300 | — | 3,000 | 1,200 | — | — |
| Yield Strength, M psi | D-1708 | 1.30 | 3.68 | 1.93 | 2.33 | 1.64 | 2.12 | 3.61 | 1.67 |
| Elongation, % | D-1708 | 471 | 520 | 282 | 346 | 427 | 367 | 437 | 418 |
| Flex Modulus, M psi | D-790-A | 22.91 | 13.24 | 48.39 | 55.29 | 37.99 | 53.53 | 22.01 | 41.17 |
| Hardness (Shore D) | D-2240 | 57 | 56 | 66 | 68 | 64 | 67 | 62 | 63 |
| Abrasion Resistance, National Bureau of Standard Index | D-1630 | 230 | 150 | — | — | — | — | — | — |
| THERMAL | | | | | | | | | |
| Heat Deflection Temp., at 66 psi °F. | D-648 | 114 | 111 | 120 | 117 | 117 | 114 | 116 | 115 |
| Heat Deflection Temp., with 30% Glass Filler, at 66 psi | D-648 | 192 | — | 130 | — | — | — | — | — |
| Vicat Temperature, °F.-Rate B | D-1525-70 | 176 | 138 | 142 | 138 | 160 | 144 | 142 | 158 |
| Melting Point, °F., by Differential Thermal Analysis | — | 210 | 185 | 190 | 187 | 198 | 194 | 196 | 201 |
| Freezing Point, °F., by | | | | | | | | | |

TABLE II-continued

| Differential Thermal Analysis | — | 190 | 142 | 149 | 131 | 176 | 162 | 163 | 171 |
|---|---|---|---|---|---|---|---|---|---|

In order to maintain its structural integrity under long-term and continuous abrasion, the ionomer resin layer of the laminate structure must possess a minimum thickness of at least about 5 mils (1 mil=0.0001 inch), this thickness being increased relative to the degree of abrasion expected under in-service conditions. Thus, for example, when the laminate structure of this invention is to be employed as a covering for horse stalls, the laminate employed as the wall covering advantageously possesses a range of thickness for the ionomer resin layer of from about 10 mils to about 25 mils and preferably, a thickness of from about 15 mils to about 20 mils, and the laminate employed as the floor covering (which, of course, is subjected to a much greater degree of wear) advantageously possesses a range of thickness for the ionomer resin layer of from about 20 mils to about 200 mils, and preferably, from about 25 mils to about 100 mils. The ionomer resin layer can also be built up from a succession of individual ionomer resin layers one or more of which possesses a thickness of less than 5 mils provided the agreggate thickness of the built-up layer exceeds 5 mils. While in general there is no limitation upon the maximum thickness of the ionomer resin layer for any application of the laminate structure, cost considerations alone militate against the use of a thickness of this polymer which greatly exceeds particular in-service requirements.

As will be appreciated by those skilled in the art, the ionomer resin layer can contain one or more additives such as fillers, fire retardants, anti-oxidants, UV stabilizers, reinforcing fibers, plasticizers, pigments, dyes, etc., in the usual amounts. Prior to application to the underlying foamed resin layer, the ionomer resin layer can also be provided with a reinforcing web backing of natural or synthetic mineral or organic fiber, e.g., a web manufactured from a polyester such as polyethyleneterephthalate, a polyamide (nylon) a fiberglass. It is further contemplated that the exposed surface of the ionomer resin layer can be provided with a thin coating layer, e.g., an acrylic coating, to improve soil repellancy and/or durability as in U.S. Pat. No. 3,979,540, the disclosure of which is incorporated by reference herein. The exposed surface of the ionomer resin layer can also be embossed in a known and conventional manner with any desired pattern such as one intended to improve the non-slip properties of the layer.

The foamed resin substrate layer herein can be selected from any one of several known and conventional foamed thermoplastic or thermosetting polymers and copolymers including the polyolefins such as polyethylene, polypropylene, polybutene, polybutadiene and ethylenepropylene copolymer, polystyrene, acrylonitrile-butadiene-styrene terpolymer, ionomer resin, polyvinyl halide such as polyvinyl chloride and polyvinylidene chloride, acrylic and methacrylic resins, acrylonitrile-styrene copolymer, polycarbonate, polyurethane, and the like. The foamed layer, which can be prepared in accordance with well known procedures such as foaming with a halogenated hydrocarbon foaming agent, is preferably of the closed cell type to prevent the layer from taking up liquid with which it may come into contact. In order to sustain the static and dynamic forces to which the animal stall and floor coverings of this invention will be subjected, and to provide an adequate measure of resiliency conducive to the comfort of the animals occupying stalls equipped with the coverings, it is necessary that the aggregate density of the foamed resin substrate herein be within the range of from about 0.50 to about 10.0 and preferably from about 0.90 to about 5.0. It is further a requirement of the foamed resin layer that it possess a minimum thickness of at least about 200 mils. Optimum selection of foamed resin layer density and thickness will, of course, depend upon the in-service requirements for a particular laminate covering. Again, citing horse stall coverings as illustrative, the foamed resin layer preferably possesses a density of from about 0.90 to about 5.0 with a minimum thickness of about 250 mils for use in wall coverings and a minimum thickness of about 800 mils for use in floor coverings. The foamed resin substrate can be provided either as a single homogeneous layer of desired density and thickness or as a succession of two or more foamed resin layers having identical or different physical and/or chemical characteristics which in the aggregate possess the desired density and thickness. Thus, for example, a composite foam resin layer can be made up on two or more individual layers with the layer in direct contact with the floor of the animal stall or shelter having resistance to alkali and/or acid materials, for example, those commonly employed in or as cleansing and disinfecting agents, which is superior to that of the intermediate layer(s) which need not possess this capability. As with the ionomer resin surface layer, there is in general no functional limitation upon the maximum thickness of the foam layer except for considerations of product cost effectiveness.

In accordance with the present invention, an animal stall floor covering for horses is prepared by melt extruding a commercially available ionomer resin, "Surlyn" 1801 (E. I. du Pont de Nemours and Company), upon a closed cell polyethylene substrate layer having a specific gravity (density), measured in accordance with ASTM-D-792 method of 0.96, a melt index of 2.0 and a thickness of about 100 mils and the resulting laminate is thereafter applied to an identical polyethylene foam layer built up from four adjacent 250 mil layers with the ionomer resin being the outermost layer of the laminate. In lieu of melt extrusion, the ionomer layer can be adhered to the foam layer with the use of any one of several resin laminate adhesives known in the art.

What is claimed is:
1. An abrasion resistant, impact absorbent animal stall floor and wall covering which comprises a laminate of:
   (a) a liquid impermeable layer of an ionomer resin, said layer having an aggregate minimum thickness of about 5 mils, superimposed upon
   (b) a foamed resin layer having an aggregate minimum thickness of about 200 mils, and an aggregate density in the range of from about 0.50 to about 10.0 lbs. per cubit foot.
2. The animal stall floor and wall covering of claim 1 obtained by copolymerizing a monoethylenically unsaturated alpha-olefin of from 2 to 10 carbon atoms and an alpha, beta ethylenically unsaturated carboxylic acid of from 3 to 8 carbon atoms to provide a copolymer containing at least 50 mol percent polymerized alpha-olefin and from 0.2 to 25 mol percent polymerized alpha-beta ethylenically unsaturated carboxylic acid in random distribution and thereafter reacting the copolymers with an ionizable metal compound which results in crosslinking of the copolymer.

3. The animal stall floor and wall covering of claim 2 wherein the alpha-olefin is ethylene, the alpha-beta ethylenically unsaturated carboxylic acid is methacrylic acid and the ionizable metal compound contains zinc or sodium ions.

4. The animal stall floor and wall covering of claim 1 wherein the ionomer resin possesses a melt flow index in decigm/min, measured in accordance with ASTM method D-1238 of from about 1.0 to about 15.0; a density measured in accordance with ASTM method D-792 of from about 0.920 to about 0.980; an area yield, in$^2$/lb at 10 mils, of from about 2,800 to about 3,000; tensile impact in ft lb/in$^2$ at 72° F., measured in accordance with ASTM method D-1822 of from about 275–550; a brittleness temperature, in ° F., measured in accordance with ASTM method D-746 of from about −200 to about −20; tensile strength, in M psi, measured in accordance with ASTM method D-1708 of from about 2.70 to about 4.70; MIT flex, cycles, 25 mils thick, of from about 400 to about 4000; a yield strength, in M psi, measured in accordance with ASTM method D-1708 of from about 300 to about 550; an elongation, in %, measured by ASTM method D-1708 of from about 300 to about 550; a flex modules, in M psi, measured in accordance with ASTM method D-790-A of from about 20 to about 60; a hardness, (Shore D), measured in accordance with ASTM method D-2240 of from about 55 to about 70; an abrasion resistance, National Bureau of Standards Index, measured in accordance with ASTM method D-1630 of from about 100 to about 700; a heat deflection temperature, at 66 psi, measured in accordance with ASTM method D-648 of from about 105 to about 130; a heat deflection temperature with 30% glass filler, at 66 psi, measured in accordance with ASTM method D-648 of from about 125–200; a Vicat temperature, in ° F.-Rate B, measured in accordance with ASTM method D-1525-70 of from about 125–185; a melting point, in ° F., measured in accordance with differential thermal analysis, of from about 160 to about 220; and, a freezing point, in ° F., measured in accordance with differential thermal analysis of from about 120 to about 200.

5. The animal stall floor and wall covering of claim 1 especially adapted for use as a horse stall wall covering wherein the ionomer resin possesses a thickness of from about 10 mils to about 25 mils.

6. The animal stall floor and wall covering of claim 5 wherein the ionomer resin possesses a thickness of from about 15 to about 20 mils.

7. The animal stall floor and wall covering of claim 1 especially adapted for use as a horse stall floor covering wherein the ionomer resin possesses a thickness of from about 20 to about 200 mils.

8. The animal stall floor and wall covering of claim 7 wherein the ionomer resin possesses a thickness of from about 25 mils to about 100 mils.

9. The animal stall floor and wall covering of claim 1 wherein the foamed resin layer is a foamed polyolefin resin.

10. The animal stall floor and wall covering of claim 9 wherein the foamed polyolefin resin is a foamed polyethylene resin.

11. The animal stall floor and wall covering of claim 1 especially adapted for use as a horse stall wall covering wherein the foamed resin layer possesses an aggregate density of from about 0.90 to about 5.0 lbs per cubic foot and an aggregate minimum thickness of about 250 mils.

12. The animal stall floor and wall covering of claim 1 especially adapted for use as a horse stall floor covering wherein the foamed resin layer possesses an aggregate density of from about 0.90 to about 5.0 lbs per cubic foot and an aggregate minimum thickness of about 800 mils.

13. A method for absorbing the impact of animal hooves which comprises interposing between a surface and animal hooves contacting said surface, an abrasion resistant, impact absorbent laminate of:
(a) a liquid impermeable layer of an ionomer resin, said layer having an aggregate minimum thickness of about 5 mils, superimposed upon
(b) a foamed resin layer having an aggregate minimum thickness of about 200 mils, and an aggregate density in the range of from about 0.50 to about 10.0 lbs. per cubic foot.

14. The method of claim 13 wherein the ionomer resin is obtained by copolymerizing a monoethylenically unsaturated alpha-olefin of from 2 to 10 carbon atoms and an alpha, beta ethylenically unsaturated carboxylic acid of from 3 to 8 carbon atoms to provide a copolymer containing at least 50 mol percent polymerized alpha-olefin and from 0.2 to 25 mol percent polymerized alpha-beta ethylenically unsaturated carboxylic acid in random distribution and thereafter reacting the copolymers with an ionizable metal compound which results in crosslinking of the copolymer.

15. The method of claim 14 wherein the alpha-olefin is ethylene, the alpha-beta ethylenically unsaturated carboxylic acid is methacrylic acid and the ionizable metal compound contains zinc or sodium ions.

16. The method of claim 13 wherein the ionomer resin possesses a melt flow index in decigm/min, measured in accordance with ASTM method D-1238 of from about 1.0 to about 15.0; a density measured in accordance with ASTM method D-792 of from about 0.920 to about 0.980; an area yield, in$^2$/lb at 10 mils, of from about 2,800 to about 3,000; tensile impact in ft lb/in$^2$ at 72° F., measured in accordance with ASTM method D-1822 of from about 275–550; a brittleness temperature, in ° F, measured in accordance with ASTM method D-746 of from about −200 to about −20; tensile strength in M psi, measured in accordance with ASTM method D-1708 of from about 2.70 to about 4.70; MIT flex, cycles, 25 mils thick, of from about 400 to about 4000; a yield strength, M psi, measured in accordance with ASTM Method D-1708 of from about 300 to about 550; an elongation, in %, measured by ASTM method D-1708 of from about 300 to about 550; a flex modules, in M psi, measured in accordance with ASTM method D-790-A of from about 20 to about 60; a hardness, (Shore D), measured in accordance with ASTM method D-2240 of from about 55 to about 70; an abrasion resistance, National Bureau of Standards Index, measured in accordance with ASTM method D-1630 of from about 100 to about 700; a heat deflection temperature, at 66 psi, measured in accordance with ASTM method D-648 of from about 105 to about 130; a heat deflection temperature, with 30% glass filler, at 66 psi, measured in accordance with ASTM method D-648 of from about 125–200; a Vicat temperature, in ° F.-Rate B, measured in accordance with ASTM method D-1525-70 of from about 125–185; a melting point, in ° F., measured in accordance with differential thermal analysis, of from about 160 to about 220; and, a freezing point, in ° F., measured in accordance with differential thermal analysis, of from about 120 to about 200.

17. The method of claim 13 wherein the laminate is adapted for use as a horse stall wall covering and wherein the ionomer resin of said laminate possesses a thickness of from about 10 mils to about 25 mils.

18. The method of claim 17 wherein the ionomer resin possesses a thickness of from about 15 to about 20 mils.

19. The method of claim 13 wherein the laminate is adapted for use as a horse stall floor covering and wherein the ionomer resin possesses a thickness of from about 20 to about 200 mils.

20. The method of claim 19 wherein the ionomer resin possesses a thickness of from about 25 mils to about 100 mils.

21. The method of claim 13 wherein the foamed resin layer is a foamed polyolefin resin.

22. The method of claim 21 wherein the foamed polyolefin resin is a foamed polyethylene resin.

23. The method of claim 13 wherein the laminate is adapted for use as a horse stall wall covering and wherein the foamed resin layer possesses an aggregate density of from about 0.90 to about 5.0 lbs. per cubic foot and an aggregate minimum thickness of about 250 mils.

24. The method of claim 13 wherein the laminate is adapted for use as a horse stall floor covering and wherein the foamed resin layer possesses an aggregate density of from about 0.90 to about 5.0 lbs. per cubic foot and an aggregate minimum thickness of about 800 mils.

* * * * *

UNITED STATES PATENT AND TRADEMARK OFFICE
CERTIFICATE OF CORRECTION

PATENT NO. : 4,333,981

DATED : June 8, 1982

INVENTOR(S) : Fred Scalamandre on behalf of and as Agent for Armand G. Winfield, et al.

It is certified that error appears in the above-identified patent and that said Letters Patent are hereby corrected as shown below:

In Table II, Column 6: "AD 1804" should read as --AD 8104--.

Signed and Sealed this

Ninth Day of November 1982

[SEAL]

Attest:

Attesting Officer

GERALD J. MOSSINGHOFF

Commissioner of Patents and Trademarks